United States Patent [19]

Ferm

[11] Patent Number: 4,786,543

[45] Date of Patent: Nov. 22, 1988

[54] CEILING TILE OF EXPANDED POLYSTYRENE LAMINATED WITH EMBOSSED VINYL SHEET

[76] Inventor: Don Ferm, P.O. Box 715, Bentonville, Ark. 72712

[21] Appl. No.: 104,962

[22] Filed: Oct. 6, 1987

[51] Int. Cl.$^4$ ................................................. B32B 3/26
[52] U.S. Cl. ...................................... 428/138; 156/78; 156/251; 156/256; 156/264; 428/159; 428/213; 428/215; 428/314.8; 428/316.6; 428/317.7; 428/318.6
[58] Field of Search ............... 156/78, 251, 256, 264; 428/137, 138, 158, 159, 213, 215, 220, 313.5, 314.4, 314.8, 316.6, 317.1, 317.7, 318.6, 318.8

[56] References Cited

U.S. PATENT DOCUMENTS

| | | | |
|---|---|---|---|
| 3,177,109 | 4/1965 | Ziegler | 156/78 |
| 3,531,367 | 9/1970 | Karsten | 428/317.7 |
| 3,565,746 | 2/1971 | Stevens | 428/314.8 |
| 3,654,069 | 4/1972 | Freudenburg et al. | 428/515 |
| 3,734,811 | 5/1973 | Small et al. | 156/256 |
| 3,823,047 | 7/1974 | Colombo | 428/314.4 |
| 4,487,793 | 12/1984 | Haines et al. | 428/137 |
| 4,525,406 | 6/1985 | Pollock | 428/137 |

FOREIGN PATENT DOCUMENTS 747341 11/1966 Canada ............................ 428/317.1

*Primary Examiner*—William J. Van Balen
*Attorney, Agent, or Firm*—Robert R. Keegan

[57] ABSTRACT

There is disclosed a drop-in ceiling tile or the like together with method of making the same wherein expanded polystyrene in a large block is cut into substrate sheets approximately two feet by four feet by three-quarters to one inch thick using a hot-wire cutter, which substrate sheet thereafter is provided with a thin facing of vinyl plastic stretch resistant sheet, e.g. rigid PVC, about 0.001 to about 0.005 inches in thickness having nearly invisible perforations therein to facilitate the escape of moisture from water base adhesive utilized to laminate the vinyl sheet onto the expanded polystyrene substrate. The vinyl sheet will previously have been textured in a conventional manner or otherwise decorated, in a preferred embodiment. The product and method of making it is adapted to rapid repetitive batch processing with a maximum of a few hours from start of sheet cutting to finish and packaging of the product thereby allowing production on demand with minimal storage space requirements or investment in finished product.

21 Claims, 1 Drawing Sheet

CEILING TILE OF EXPANDED POLYSTYRENE LAMINATED WITH EMBOSSED VINYL SHEET

The present invention relates to ceiling tile or ceiling panels for homes, offices, stores, and the like, and particularly such panels of the drop-in type. The configuration of the panels is generally standardized to two feet by four feet modules with a thickness of about three-quarters inch to one inch. The particular embodiments described herein are not of the self-supporting type and thus, there are not tongues or grooves on the ceiling tile. However, the construction described herein could be adapted to the more complex form of tiles and panels or to different dimensions.

In order to reduce the load supporting requirements for the structural members in the ceiling it is desirable to have a ceiling tile or panel of low density and hence of low weight. Other previous forms of tile have used materials of varying density from rather dense wood fiber to substantially lighter fiberglass. The ceiling tile according to the present invention is of expanded polystyrene and the density and weight is extremely low. A two-by-four-by-one inch panel will weigh substantially less than one pound.

In addition to reducing the support structure requirements, there is essentially no hazard from the tiles of the present invention if some mishap should cause them to fall on the occupants of the building, even if the height of the ceiling is substantial. Obviously there is also a cost saving in shipping with lighter weight panels.

Ceiling tiles or panels according to the present invention are provided with a facer of thin, solid vinyl plastic (e.g. rigid PVC) sheet which provides a decorative surface, but also stiffens the panel against bending or sagging because the vinyl sheet is resistant to stretching. Accordingly panels of only three-quarter to one inch thickness have resistance to sagging which permits them to support lights, vents, sound system loudspeakers, or additional insulation placed on top of the tile.

The expanded polystyrene foam inherently comprises largely cells of dead air space and provides good thermal insulation. For the purpose of increasing insulation or increasing strength the panels may be made as thick as two or more, although the normal range is three-quarters of an inch to one inch.

Qualitative sound absorption data on the tiles is not available, but it is bevieved they are at least equal to other tiles with a relatively flat decorative surface. Fire rating data on the tiles is not available, but is expected to be equivalent to or better than other tiles with plastic or wood fiber components.

It should be pointed out that the expanded polystyrene from which the ceiling tiles of the present invention are fabricated is distinctly different from other cellular plastics which commonly are fabricated by extrusion, notably Styrofoam, extruded styrene resin foam and, sometimes, extruded polystyrene foam. The material in the ceiling tile of the present invention is batch processed in large molds and sliced into panels of the desired thickness and horizontal dimensions.

The facer used for decorative purposes, and for other purposes, in the construction of the tile is preferably of a stretch resistant material such as vinyl acetate copolymer, vinyl chloride copolymer, or rigid vinyl copolymer, in the form of a thin sheet; the preferred material is rigid PVC (polyvinyl chloride). Because of the thinness of the sheet, typically 0.002 inches, little additional weight is added to the tile, but it is provided with at least one impervious decorative surface which does not tend to absorb dust or dirt and is relatively immune to discoloration from air pollution or other causes. The preferred vinyl facer could be cleaned by vacuum or otherwise if desired.

An optional step in the manufacturing process involves perforation of the plastic facer sheet with small, almost invisible holes or slits. This avoids entrapment of moisture from the adhesive, and reduces drying or curing time in the process. The perforations may have a desirable effect on accoustical properties, but quantitative evaluation of this factor has not been made.

A simple, but effective process of adhering the plastic facer sheet is preferred, and this may be accomplished by a semi-automated or automated process if desired. A water base adhesive, such as that manufactured by H. B. Fuller Company under product No. AP-528M may be used. In any event high toxicity products or processes may be avoided in the manufacturing process. The "skin" produced on a cut surface by a hot-wire cutter does not interfere with bonding the facer sheet and may actually be helpful.

The various steps in the process of manufacture can be performed rapidly. This gives the option of custom manufacture and direct loading for shipment by truck or otherwise, thereby eliminating excessive handling and minimizing requirements for storage of inventory of various forms of the product.

Although ceiling tile manufacturing processes and products previously known necessarily have similarities to the present product and process, they do not achieve the multiple advantages which are achieved by the product and process of the present invention.

Some relevant features are shown in the following patents typical of those of which applicant is aware. Ralph Karsten U.S. Pat. No. 3,531,367 granted Sept. 29, 1970, discloses a sheet of foamed polystyrene typically $\frac{1}{8}$ inch thick having bonded thereto with a xylol solution, a polyolefin sheet having a thickness of about 0.01 inches. Colombo U.S. Pat. No. 3,823,047 granted July 9, 1974, shows a thermal process for laminating a paper or metal foil sheet, or a high temperature melting point plastic to an extruded polystyrene foam web. Freudenberg U.S. Pat. No. 3,654,069 granted Apr. 4, 1972, shows an extruded polystyrene sheet having a film laminated thereto at the time of extrusion of the substrate. Stevens U.S. Pat. No. 3,565,746 granted Feb. 23, 1971, discloses a polyurethane cellular substrate provided with a facing layer of a monovinyl aromatic compound-/alpha-electronegatively substituted ethene compound interpolymer system together with an intermediate layer of elastomeric of cellular polyurethane.

The methods of the above prior patents together with the products produced thereby are distinctly different from the present invention which relates to expanded polystyrene rather than extruded polystyrene, and the lamination thereon of a relatively non-stretchable vinyl facing sheet, preferably with a water soluble adhesive.

In adition to providing the features and advantages described above, it is an object of the present invention to provide a novel dropin ceiling tile having lower costs, lighter weight, excellent insulation qualities, while generally retaining advantages of previously known ceiling tiles.

It is another object of the present invention to provide such a novel tile in which a facing sheet of stretch resistant vinyl material of less than 0.01 inches in thickness is laminated to the substrate expanded polystyrene material to provide a smooth clean surface and increase the tiles' strength against bending and sagging.

It is still another object of the present invention to provide a novel ceiling tile of exceptionally light weight with a thickess of about one inch, and having a facing sheet adhered thereto, such sheet having nearly invisible perforations allowing vapors from the adhesive used to laminate the facing sheet to the substrate sheet to escape rapidly thereby reducing the time required to produce and package the product.

Other objects and advantages of the invention will be apparent from a consideration of the following description in conjunction with the appended drawings in which.

Figure 1:
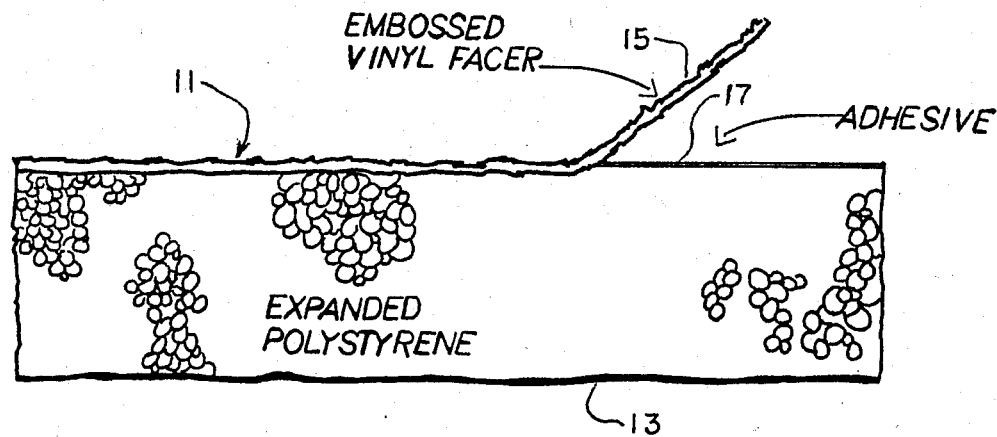
FIG. 1 is an edgewise elevational view of a tile according to the present invention illustrating the manner of lamination of the facer sheet on the substrate sheet.

Referring now to the drawings, and particularly to FIG. 1, a fragmentary portion of a ceiling panel 11 is shown according to the invention having a substrate 13 of expanded polystyrene approximately one inch thick which has been cut from a large block of expanded polystyrene by a hot-wire cutter, or the like. A vinyl facer 15 of a thickness of about 0.002 inches is laminated on the substrate 13 by use of a water solvent adhesive.

Although the laminating operation could be done with simple hand tools preferably the substrate is fed into an adhesive spreader machine to apply an even coat of adhesive a few mils in thickness. Such machines are in common use and are available from Black Brothers Company, for example. Alternatively the adhesive could be sprayed on or applied by other means.

The vinyl facer sheet is preferably cut to the size of the substrate for the panel before being put in place on the substrate surface. Cutting of the vinyl facer sheet could be rendered semi-automatic or automatic if desired. Vinyl facer sheet 15 is preferably formed of a stretch resistant plastic such as rigid PVC. This sheet material is available in pre-embossed form and this form is preferred for its attractive appearance. One souce of such material is Diversitech General Company. For the purpose of this description stretch resistant will mean that a sheet one inch wide will elongate less than 20% upon application of a stretch force of five pounds.

Figure 2:
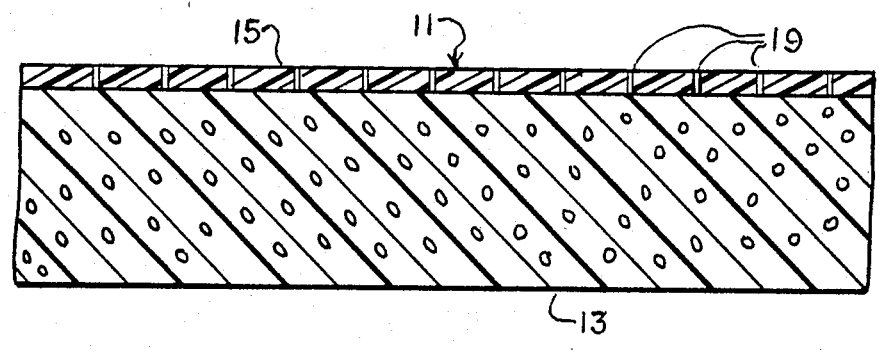
FIG. 2 is a sectional view of a portion of a ceiling tile according to the present invention.

As best seen in FIG. 2 it may be desired to perforate the vinyl facer 15 with small almost imperceptible slits or holes 19 before placing it in position on the substrate sheet 13. This may be done by passing it through a perforating roller, or by other known techniques. It is desirable to have a large number of such perforations and the spacing is preferably from about one-quarter inch to about one inch between perforations. The perforations allow the escape of moisture or other vapors from the adhesive thus accelerating the drying process and shortening the production time. The perforations are thought to provide better noise absorption characteristics, but there is no qualitative data on comparative noise absorption characteristics.

Although other than water solvent adhesives may be employed, it is preferred to utilize simple water solvent adhesives because they create no toxicity problems and are highly effective in providing a strong and permanent bond. Such an adhesive manufactured by H. B. Fuller Company with product No. AP-528M is quite suitable.

Figure 3:
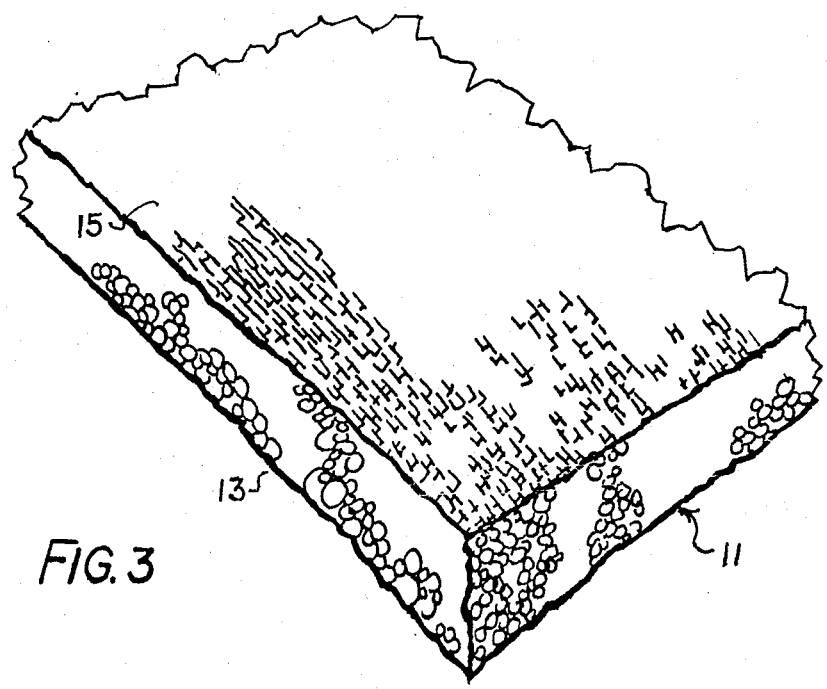
FIG. 3 is a fragmentary perspective view of a ceiling tile according to the present invention.

Although vinyl facer sheet could be applied to both surfaces of the substrate sheet there is normally no reason to do so since one surface will be out of signt in the contemplated use of the ceiling panels. As seen in FIG. 3 one surface of a finished panel 11 is covered with the embossed, rigid polyvinyl chloride facer sheet 15 and other surfaces of the panel are uncoated and uncovered surfaces of the substrate sheet 13.

In the process of making the panels according to the present invention the starting material for the substrate is a readily available solid plastic head of expandable polystyrene. The beads are first processed through a pre-expansion process wherein the beads are fed into a pre-expander machine at a given rate and then steam is injected into the same machine and mixed into the beads at a controlled pressure and temperature.

This mixture is constantly agitated so that the heat energy of the steam is evenly absorbed by the beads activating a gas by chemical action in the beads causing them to expand to form a larger volume of now prepuffed beads. This is essentially a thermal process wherein the plastic is heated and softened to cause it to flow in a semi-liquid state, thereby expanding or puffing the beads.

Preferably the pre-expanded material is aged for several hours to allow the pressure within the beads to equalize. As the beads cool, air diffuses into the beads, and after aging the beads are relatively cool and pressure in the beads is equalized to atmospheric pressure.

After the pre-fuffed beads have been aged they are conveyed by suitable means to a mold. Typically the mold is a large steel cavity with dimensions of two feet by four feet by sixteen feet, for example, with the necessary structural strength to withstand the final molding pressures.

The mold is generally provided with a pneumatically operated closure which is actuated to close the mold cavity once the mold is filled to the desired level with pre-expanded and aged beads. The mold is provided with means for injecting steam in large volume to again activate the now pre-expanded beads to generate gas within the beads causing them to expand and increase in volume. Heat and pressure causes expansion of the beads and thermal fusion to form a solid block of expanded polystyrene with a cellular conformation.

After a period of time adequate for the expansion and fusion to take place steam injection is discontinued and the pressure subsides. This permits the mold to be opened and the large block of expanded polystyrene to be removed. Preferaby the block is aged for one, or several, days at room temperature before further processing. Following the aging period the pressure within the block cells has stabilized and moisture or other vapors have largely diffused out of the moled block.

The next step in the process is cutting the block into smaller sheets, panels, or other shapes according to the requirements of the product to be produced. Preferably, a hot-wire cutting machine (slabbing and down cutter machine) is used for cutting the blocks into ceiling panel sizes. Hot-wire cutting machines are well known in the industry and are characterized by a series of generally parallel wires of 0.01 to 0.02 inches diameter with appropriate electrical resistance for allowing them to be heated above the melting point of the expanded polystyrene by passage of electric current therethrough. The large polystyrene block may thus be cut into sheets or panels by the hot-wire cutting machine in a manner analogous to the operation of a tomato slicer. Any necessary cutting to width or length of the panels is also preferably accomplished with a hot-wire cutter machine, although other means may be used for cutting the panels to size.

It will be noted that the process here involved is quite different from, and bears no similarity to the extrusion process utilized in producing Styrofoam, extruded polystyrene, or the like. The products are also dissimilar.

When the panels have been cut to size they are immediately ready for application of the rigid vinyl facer sheet 15. As previously discussed this sheet is preferably cut to size before being applied to the substrate sheet which has been coated on one surface with an appropriate adhesive, preferably a non-toxic adhesive with a water solvent.

The production of the rigid vinyl facer sheet material is not a part of the present invention, but generally such material is extruded to about 0.002 inches (or with a range of from 0.001 to 0.005 inches); after extrusion it is embossed with one of a number of available patterns by passing through embossing rollers, or by other procedures.

As previously discussed the facing sheet 15 optionally is provided with very small slits or holes 19 which may be accomplished before or after the sheet is cut to the size of the substrate sheet. Preferably the holes or slits are small enough so that they are virtually invisible from a distance of a few feet, and thus they are not seen when the ceiling panels are finally in place. After the facing sheet has been laminated to the substrate sheet the panel is completed and is normally allowed to dry for one, or a few, hours before being packed and shipped.

The entire process starting from cutting the large block of expanded polystyrene to packing and shipping may be done in as little as half a day, thus making it possible to produce the product to order and avoiding the necessity of maintaining inventory of different thicknesses, sizes, or patterns of ceiling panels. The following examples illustrate various processes according to the invention, Example One being preferred.

EXAMPLE 1

From a two-by-four-by-sixteen foot block of aged expanded polystyrene cut a substantially three-quarter inch by two feet by sixteen feet sheet with a conventional hot-wire cutter.

Cut substantially two feet by four feet substrate sheet from the three-quarter inch thick expanded polystyrene sheet.

From a two foot by four foot roll of rigid polyvinyl chloride decoratively embossed 0.002 inch thick sheet, cut a two foot by four foot facer sheet to match the substrate sheet.

Perforate the facer sheet with ⅛ inch slits ½ inch apart.

Apply adhesive AP-F128M of H. B. Fuller Company on the substrate surface with a thickness of from 0.001 to 0.003 inches.

After about one minute lay the rigid PVC sheet on adhesive layer and smooth out.

Set aside and allow to dry for 20 minutes exposed to room temperature air.

Pack this and similar panels in cartons of 10 or more and seal.

EXAMPLE 2

From a two-by-four-by-sixteen foot block of aged expanded polystyrene cut a substantially one inch by two feet by sixteen feet sheet with a conventional hot-wire cutter.

Cut substantially two feet by four feet substrate sheets from the one inch thick expanded polystyrene sheet.

From a two foot or four foot roll of rigid vinyl 0.002 inch thick sheet, cut a two foot by four foot sheet to match the substrate sheet.

Spray a latex base water solvent adhesive on the substrate surface with a thickness of about 0.001 inches.

Lay the rigid vinyl sheet on the adhesive layer.

Set aside and allow to dry for 20 minutes exposed to air at least 30° F. above room temperature air.

EXAMPLE 3

From a four-by-four-by sixteen foot block of aged expanded polystyrene cut a substantially two inch by four feet by sixteen feet sheet with a conventional hot-wire cutter.

Cut substantially two feet by two feet substrate sheets from the two inch thick expanded polystyrene sheet.

From a two foot roll of rigid polyvinyl chloride decoratively embossed 0.004 inch thick sheet, cut a two foot by two foot sheet to match the substrate sheet.

Apply adhesive AP-F128M of H. B. Fuller Company on the substrate surface with a thickness of about 0.002 inches.

After about one minute lay the rigid PVC sheet on the adhesive layer.

Set aside and allow to dry for 20 minutes exposed to room temperature air.

Pack in cartons and seal.

EXAMPLE 4

From a two-by-four-by-sixteen foot block of aged expanded polystyrene cut a substantially three-quarter inch by two feet by sixteen feet sheet with a convetional hot-wire cutter.

Cut substantially two feet by four feet substrate sheets from the three-quarter inch thick expanded polystyrene sheet.

From a two foot or four foot roll of rigid polyvinyl chloride decoratively embossed 0.002 inch thick sheet with surface contour variations of at least 0.01 inches, cut a two foot by four foot facer sheet to match the substrate sheet.

Apply adhesive AP-F128M of H. B. Fuller Company on the facer sheet surface with a thickness of about 0.001 inches.

Lay the rigid PVC sheet on the adhesive layer and smooth out.

Set aside and allow to dry.

In addition to the variation and modification to the product and process of the invention suggested above it will be apparent to those skilled in the art that other variations and modifications may be made as desired, and accordingly the scope of the invention is not to be considered limited to those embodiments of the invention shown, described, or suggested, but is rather to be determined by reference to the appended claims.

What is claimed is:

1. A drop-in ceiling tile or the like comprising
   a. A substrate sheet of expanded polystyrene approximately one inch by two feet by four feet cut from a block with a hot-wire cutter, b. a stretch resistant plastic sheet of vinyl or the like adhered to one face of said substrate sheet, said plastic sheet having a thickness of from 0.001 to 0.005 inches.

2. The product as recited in claim 1 wherein said plastic sheet is formed of a stretch resistant polyvinyl chloride material and is about 0.002 inches in thickness.

3. The product as recited in claim 1 wherein said plastic sheet is adhered with a water solvent, derived adhesive.

4. The product as recited in claim 2 wherein said plastic sheet is relatively impervious and is embossed with a crinkled pattern with surface contour variations of at least 0.01 inches.

5. The product as recited in claim 1 wherein the cells in said expanded polystyrene have an average dimension of from 0.05 inches to 0.25 inches.

6. The method of making a drop-in ceiling tile or the like comprising the steps of
   a. expanding polystyrene to form a cellular block with dimensions at least one foot by two feet by four feet,
   b. using a hot-wire cutter to cut said block into substrate sheets approximately one inch by two feet by four feet,
   c. applying a water solvent adhesive to said substrate sheets,
   d. adhering a thin plastic sheet on each substrate sheet to cover a face thereof, and
   e. allowing each said combined substrate sheet and facer sheet to cure in an atmosphere above 30° F. for at least one-half hour.

7. The method as recited in claim 6 wherein said plastic sheet is formed of a stretch resistant vinyl material and is about 0.002 inches in thickness.

8. The method as recited in claim 6 wherein said adhesive is a water base derived product.

9. The method as recited in claim 6 wherein the step of allowing said combined substrate sheet and facer sheet to cure is carried out in a dry air atmosphere above 50° F. for at least one-half hour.

10. The method as recited in claim 6 wherein said thin plastic sheet is relatively impervious and is embossed with a crinkled pattern with surface contour variations of at least 0.01 inches.

11. The method as recited in claim 6 wherein the cells in said expanded polystyrene have an average dimension of from 0.05 inches to 0.25 inches.

12. The method of making a drop-in ceiling tile or the like comprising the steps of
   a. using a hot-wire cutter to cut a block of expanded polystyrene foam into substrate sheets approximately one inch by two feet by four feet,
   b. preparing a thin plastic sheet for use as a facer on each of said substrte sheets by perforating the plastic sheet at intervals less than one inch with apertures of less than one-quarter inch in their greatest transverse dimension,
   c. applying an adhesive to at least one of said plastic sheets and said substrate sheets, and
   d. adhering each said plastic sheet on a face of one of said substrate sheets.

13. The method as recited in claim 12 wherein said plastic sheet is formed of a stretch resistant vinyl material and is about 0.002 inches in thickness.

14. The method as recited in claim 12 wherein said adhesive is a water solvent, product.

15. The method as recited in claim 12 further including the step of allowing said combined substrate sheet and facer sheet to dry in a dry air atmosphere above 30° F. for at least one-half hour.

16. The method as recited in claim 12 wherein said thin plastic sheet is relatively impervious except for said apertures and is embossed with a crinkled pattern with surface contour variations of at least 0.01 inches.

17. A drop-in ceiling tile or the like made by the method of
   a. expanding polystyrene to form a cellular block with dimensions at least about two inches by two feet by four feet,
   b. using a hot-wire cutter to cut said expanded polystyrene block into substrate sheets approximately one inch by two feet by four feet,
   c. preparing a thin vinyl textured plastic sheet for use as a facer on each of said substrate sheets by perforating the plastic sheet at intervals of less than about one inch with apertures less than one-half inch in their greatest transverse dimension,
   d. applying an adhesive to at least one of said plastic sheets and said substrate sheets, and
   e. adhering each said plastic sheet on a face of one of substrate sheets.

18. The product as recited in claim 17 wherein said plastic sheet is formed of a stretch resistant vinyl material and is about 0.001 to 0.005 inches in thickness.

19. The product as recited in claim 17 wherein said adhesive is a water solvent, derived product.

20. The product as recited in claim 17 wherein said thin plastic sheet prior to perforating is relatively impervious and is embossed with a crinkled pattern with surface contour variations of at least 0.01 inches.

21. The product as recited in claim 17 wherein the cells in said expanded polystyrene block have an average dimension of from 0.05 inches to 0.25 inches.

* * * * *